United States Patent
Funk

(10) Patent No.: US 10,412,064 B2
(45) Date of Patent: Sep. 10, 2019

(54) SYSTEM AND METHOD FOR IMPLEMENTING SECURE COMMUNICATIONS FOR INTERNET OF THINGS (IOT) DEVICES

(71) Applicant: CenturyLink Intellectual Property LLC, Denver, CO (US)

(72) Inventor: Tom Funk, Littleton, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 107 days.

(21) Appl. No.: 15/084,805

(22) Filed: Mar. 30, 2016

(65) Prior Publication Data

US 2017/0201504 A1 Jul. 13, 2017

Related U.S. Application Data

(60) Provisional application No. 62/277,245, filed on Jan. 11, 2016.

(51) Int. Cl.
*H04L 29/06* (2006.01)
*H04L 29/08* (2006.01)
*H04W 4/70* (2018.01)

(52) U.S. Cl.
CPC .......... *H04L 63/0471* (2013.01); *H04L 67/12* (2013.01); *H04L 67/141* (2013.01); *H04W 4/70* (2018.02)

(58) Field of Classification Search
USPC ........................................................ 713/151
See application file for complete search history.

(56) References Cited

U.S. PATENT DOCUMENTS 5,717,955 A 2/1998 Swinehart
6,388,399 B1 5/2002 Eckel
(Continued)

FOREIGN PATENT DOCUMENTS

CN 101799987 B 11/2011
KR 2015-0128346 A 11/2015
(Continued)

OTHER PUBLICATIONS

Mario et al Pub. 2005; Borisov Pub. 2004, Alexander Pub. 2009, Goldberg Pub. 2007.*

(Continued)

*Primary Examiner* — Taghi T Arani
*Assistant Examiner* — Badri Champakesan

(57) ABSTRACT

Novel tools and techniques might provide for implementing secure communications for IoT devices. In various embodiments, a gateway or computing device might provide connectivity between or amongst two or more Internet of Things ("IoT") capable devices, by establishing an IoT protocol-based, autonomous machine-to-machine communication channel amongst the two or more IoT capable devices. For sensitive and/or private communications, the gateway or computing device might establish a secure off-the-record ("OTR") communication session within the IoT protocol-based, autonomous machine-to-machine channel, thereby providing encrypted machine-to-machine communications amongst the two or more IoT capable devices, without any content of communications that are exchanged amongst the IoT capable devices over the secure OTR communication session being recorded or logged. In some cases, the secure OTR communication session utilizes cryptographic protocols including, without limitation, one or more of AES symmetric-key algorithm, Diffie-Hellman key exchange, (Continued)

US 10,412,064 B2

Page 2

SHA-1 hash function, forward secrecy, deniable authentication, malleable encryption, and/or the like.

14 Claims, 7 Drawing Sheets

(56) References Cited

U.S. PATENT DOCUMENTS

| | | |
|---|---|---|
| 6,792,319 B1 | 9/2004 | Bilger |
| 7,030,781 B2 | 4/2006 | Jones |
| 7,096,003 B2 | 8/2006 | Joao |
| 7,397,363 B2 | 7/2008 | Joao |
| 8,296,383 B2 | 10/2012 | Lindahl |
| 8,380,652 B1 | 2/2013 | Francis, Jr. |
| 9,298,410 B2 | 3/2016 | Juchem |
| 9,432,340 B1* | 8/2016 | Tutt ................. H04L 9/3247 |
| 9,456,276 B1 | 9/2016 | Chhetri |
| 9,460,618 B1 | 10/2016 | Soltesz |
| 9,646,480 B2 | 5/2017 | Fadell |
| 9,669,872 B2 | 6/2017 | Rebhan |
| 9,672,734 B1 | 6/2017 | Ratnasingam |
| 9,761,136 B2 | 9/2017 | Tonguz |
| 9,905,122 B2 | 2/2018 | Sloo |
| 9,917,903 B2* | 3/2018 | Clernon ................. H04W 4/70 |
| 10,069,751 B2* | 9/2018 | Amulothu ............... H04L 47/70 |
| 10,253,468 B1 | 4/2019 | Linville |
| 2001/0029311 A1 | 10/2001 | Khare |
| 2002/0024450 A1 | 2/2002 | Townsend |
| 2003/0061029 A1 | 3/2003 | Shaket |
| 2004/0083054 A1 | 4/2004 | Jones |
| 2004/0113773 A1 | 6/2004 | Nieters |
| 2004/0142658 A1 | 7/2004 | McKenna |
| 2004/0160319 A1 | 8/2004 | Joao |
| 2005/0248444 A1 | 11/2005 | Joao |
| 2006/0150644 A1 | 7/2006 | Wruck |
| 2006/0219382 A1 | 10/2006 | Johnson |
| 2007/0079113 A1* | 4/2007 | Kulkarni ............ H04L 63/0492 |
| | | 713/150 |
| 2008/0197204 A1 | 8/2008 | Whitney |
| 2008/0234878 A1 | 9/2008 | Joao |
| 2008/0256008 A1 | 10/2008 | Kwok |
| 2008/0300776 A1 | 12/2008 | Petrisor |
| 2008/0303654 A1 | 12/2008 | Kates |
| 2009/0121860 A1 | 5/2009 | Kimmel |
| 2009/0134993 A1 | 5/2009 | Ashworth |
| 2009/0327910 A1 | 12/2009 | Black |
| 2010/0124332 A1* | 5/2010 | Arena ................. H04L 63/0457 |
| | | 380/270 |
| 2010/0325421 A1* | 12/2010 | Park ..................... H04L 9/32 |
| | | 713/153 |
| 2011/0106321 A1 | 5/2011 | Cherian |
| 2011/0288684 A1 | 11/2011 | Farlow |
| 2012/0086563 A1 | 4/2012 | Arling |
| 2012/0265370 A1 | 10/2012 | Kim |
| 2013/0038461 A1 | 2/2013 | Hawkes |
| 2013/0217421 A1 | 8/2013 | Kim |
| 2014/0018969 A1 | 1/2014 | Forbes |
| 2014/0033288 A1* | 1/2014 | Wynn ................. H04W 12/08 |
| | | 726/7 |
| 2014/0180478 A1 | 6/2014 | Letsky |
| 2014/0257693 A1 | 9/2014 | Ehlers |
| 2014/0343950 A1 | 11/2014 | Simpson et al. |
| 2015/0097686 A1 | 4/2015 | Fadell |
| 2015/0100167 A1 | 4/2015 | Sloo |
| 2015/0109104 A1* | 4/2015 | Fadell .................. G08B 27/003 |
| | | 340/5.65 |
| 2015/0187200 A1 | 7/2015 | Fadell |
| 2015/0249672 A1* | 9/2015 | Burns .................. H04L 12/66 |
| | | 726/4 |
| 2015/0262102 A1 | 9/2015 | Tann |
| 2015/0298654 A1 | 10/2015 | Joao |
| 2015/0350247 A1* | 12/2015 | Adler .................. H04L 63/166 |
| | | 713/151 |
| 2015/0365278 A1 | 12/2015 | Chakrabarti et al. |
| 2016/0021127 A1 | 1/2016 | Yan |
| 2016/0029346 A1 | 1/2016 | Suresh et al. |
| 2016/0057122 A1* | 2/2016 | van Bergeijk .......... H04L 63/18 |
| | | 713/168 |
| 2016/0064829 A1 | 3/2016 | Schaepperle |
| 2016/0093213 A1 | 3/2016 | Rider |
| 2016/0187995 A1 | 6/2016 | Rosewall |
| 2016/0195876 A1 | 7/2016 | Mattsson |
| 2016/0212613 A1 | 7/2016 | Huang |
| 2016/0226674 A1 | 8/2016 | Kangshang et al. |
| 2016/0248746 A1* | 8/2016 | James ................. H04W 4/70 |
| 2016/0267790 A1 | 9/2016 | Raamot |
| 2016/0278599 A1 | 9/2016 | Seo |
| 2016/0294828 A1* | 10/2016 | Zakaria ................ H04W 4/70 |
| 2016/0295364 A1* | 10/2016 | Zakaria ................ H04W 4/023 |
| 2016/0323271 A1* | 11/2016 | Hinman ................ H04W 4/21 |
| 2016/0329040 A1 | 11/2016 | Whinnery |
| 2016/0330042 A1 | 11/2016 | Andersen |
| 2016/0352526 A1* | 12/2016 | Adler .................. H04L 67/1095 |
| 2016/0359965 A1* | 12/2016 | Murphy ............... H04L 67/1044 |
| 2017/0006141 A1 | 1/2017 | Bhadra |
| 2017/0006643 A1* | 1/2017 | Zakaria ................ H04W 4/70 |
| 2017/0026157 A1* | 1/2017 | Bugenhagen ......... H04L 5/0053 |
| 2017/0026472 A1* | 1/2017 | Bugenhagen .......... H04L 67/12 |
| 2017/0060369 A1 | 3/2017 | Goyal |
| 2017/0083005 A1 | 3/2017 | Hickman |
| 2017/0093866 A1 | 3/2017 | Ben-Noon |
| 2017/0110784 A1* | 4/2017 | Vermes ................. H01Q 1/2291 |
| 2017/0134937 A1* | 5/2017 | Miller ................. G06Q 20/3829 |
| 2017/0141575 A1 | 5/2017 | Fulton |
| 2017/0171747 A1* | 6/2017 | Britt ................... H04W 12/04 |
| 2017/0181383 A1 | 6/2017 | Shen |
| 2017/0187807 A1* | 6/2017 | Clemon ................ H04W 4/70 |
| 2017/0192437 A1 | 7/2017 | Bier |
| 2017/0195318 A1* | 7/2017 | Liu ..................... H04W 12/06 |
| 2017/0206900 A1 | 7/2017 | Lee et al. |
| 2017/0253258 A1 | 9/2017 | Bramucci |
| 2017/0274898 A1 | 9/2017 | Nakamura |
| 2017/0279620 A1* | 9/2017 | Kravitz ................. H04L 9/3268 |
| 2017/0300953 A1* | 10/2017 | Kim ..................... G06Q 20/06 |
| 2017/0345420 A1 | 11/2017 | Barnett, Jr. |
| 2017/0358025 A1 | 12/2017 | Varma |
| 2017/0371337 A1 | 12/2017 | Ramasamy |
| 2018/0040172 A1 | 2/2018 | Funk |
| 2018/0062691 A1 | 3/2018 | Barnett, Jr. |
| 2018/0084596 A1 | 3/2018 | Schwengler et al. |
| 2018/0103579 A1 | 4/2018 | Grufman |
| 2018/0122506 A1* | 5/2018 | Grantcharov ......... G06F 19/3481 |
| 2018/0132227 A1 | 5/2018 | Ghosh |
| 2018/0168464 A1 | 6/2018 | Barnett, Jr. et al. |
| 2018/0174449 A1 | 6/2018 | Nguyen |
| 2018/0178781 A1 | 6/2018 | Funk et al. |
| 2018/0181091 A1 | 6/2018 | Funk et al. |
| 2018/0181094 A1 | 6/2018 | Funk et al. |
| 2018/0181095 A1 | 6/2018 | Funk et al. |
| 2018/0183685 A1 | 6/2018 | Cook |
| 2018/0183874 A1 | 6/2018 | Cook |
| 2018/0299290 A1 | 10/2018 | Slavin |
| 2018/0370567 A1 | 12/2018 | Rowell |
| 2018/0374347 A1 | 12/2018 | Silver |
| 2019/0035269 A1 | 1/2019 | Donovan |
| 2019/0049994 A1 | 2/2019 | Pohl |
| 2019/0073899 A1 | 3/2019 | Radomy |
| 2019/0106099 A1 | 4/2019 | Funk et al. |

FOREIGN PATENT DOCUMENTS

| | | |
|---|---|---|
| WO | WO-2009-098676 | 8/2009 |
| WO | WO-2013-058648 | 4/2013 |
| WO | WO-2017-123392 A1 | 7/2017 |

OTHER PUBLICATIONS

NPL-Ryanetal-Auto-OTR (Year: 2008).*
NPL-Chrisetal-Improved-OTR (Year: 2007).*
International Search Report and Written Opinion prepared by the Korean Intellectual Property Office as International Searching Author-

(56) References Cited

OTHER PUBLICATIONS ity for PCT Intl Patent App. No. PCT/US2016/067938 dated Mar. 31, 2017; 11 pages.
International Preliminary Report on Patentability, dated Jul. 17, 2018, 8 pages.
Bersch, Christian, et al., "Bimanual Robotic Cloth Manipulation for Laundry Folding", Pub. 2011, 7 pages.

* cited by examiner

SYSTEM AND METHOD FOR IMPLEMENTING SECURE COMMUNICATIONS FOR INTERNET OF THINGS (IOT) DEVICES

CROSS-REFERENCES TO RELATED APPLICATIONS

This application claims priority to U.S. Patent Application Ser. No. 62/277,245 (the "'245 application"), filed Jan. 11, 2016 by Tom Funk, entitled, "IoT Security through Combining TOR Messenger with MQTT or Additional Protocols," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing communications for Internet of Things ("IoT") devices, and, in particular embodiments, to methods, systems, apparatus, and computer software for implementing secure communications for IoT devices.

BACKGROUND

Recently, Internet of Things ("IoT") communications have become more prevalent. As devices become more connected to each other, ease and risks of security or privacy breaches increase. Further, with the highly limited memory or random access memory ("RAM") resources available in some IoT sensors, devices, and/or endpoints, secure communications amongst IoT capable devices become more difficult to implement.

Hence, there is a need for more robust and scalable solutions for implementing communications for Internet of Things ("IoT") devices, and, in particular embodiments, to methods, systems, apparatus, and computer software for implementing secure communications for IoT devices.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
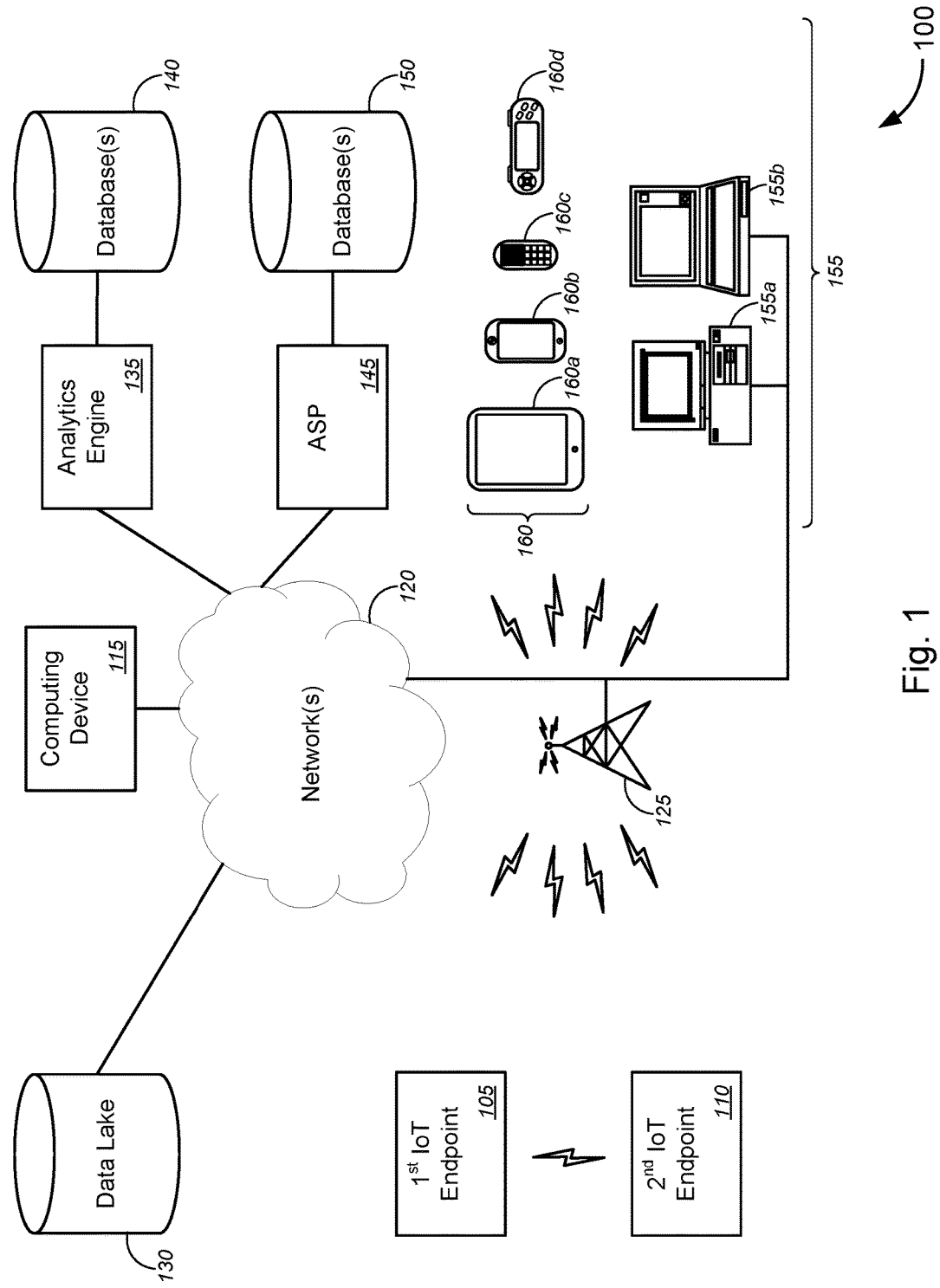
FIG. 1 is a schematic diagram illustrating a system for implementing secure communications for Internet of Things ("IoT") devices, in accordance with various embodiments.

Various embodiments provide tools and techniques for implementing communications for Internet of Things ("IoT") devices, and, in particular embodiments, to methods, systems, apparatus, and computer software for implementing secure communications for IoT devices.

In various embodiments, a gateway or computing device might provide connectivity between or amongst two or more IoT capable devices, by establishing an IoT protocol-based, autonomous machine-to-machine communication channel amongst the two or more IoT capable devices. For sensitive and/or private communications, the gateway or computing device might establish a secure off-the-record ("OTR") communication session within the IoT protocol-based, autonomous machine-to-machine channel, thereby providing encrypted machine-to-machine communications amongst the two or more IoT capable devices, without any content of communications that are exchanged amongst the IoT capable devices over the secure OTR communication session being recorded or logged.

In some cases, the secure OTR communication session is based at least in part on off-the-record messaging protocol. In some instances, the secure OTR communication session alternatively or additionally utilizes cryptographic protocols including, without limitation, one or more of AES symmetric-key algorithm, Diffie-Hellman key exchange, SHA-1 hash function, forward secrecy, deniable authentication, malleable encryption, and/or the like. According to some embodiments, the IoT protocol-based, machine-to-machine communication channel is established using an IoT protocol, while the secure OTR communication session is established using an OTR communication protocol, and the OTR communication protocol is part of the IoT protocol.

Merely by way of example, in some cases, other communications or messaging protocols (and/or systems) may be implemented, including, but not limited to, one or more of MQ telemetry transport ("MQTT"; which is a publish-subscribe-based messaging protocol), extensible messaging and presence protocol ("XMPP"; which is a communications protocol for message-oriented middleware based on extensible markup language ("XML")), universal plug and play ("UPnP"; which is a set of networking protocols that allows for seamless discover of networked devices and for establishment of functional network services for data sharing, communications, and entertainment amongst the discovered and connected devices), data distribution service ("DDS"; which is an machine-to-machines middleware ("m2m") standard for enabling scalable, real-time, dependable, high-performance, and interoperable data exchanges between publishers and subscribers), advanced message queuing protocol ("AMQP"; which is an open standard application layer protocol for message-oriented middleware), constrained application protocol ("CoAP"; which is a software protocol that allows simple electronics devices to communicate interactively over a network (e.g., Internet)), secure hypertext transfer protocol ("HTTPS"; which is a protocol for secure communication over a computer network), supervisory control and data acquisition ("SCADA"; which is a system for remote monitoring and control that operates with coded signals over communication channels), and/or the like.

Similar to secure chat off-the-record (herein referred to as "chat OTR") functions between clients using InstantBird extensible messaging and presence protocol ("XMPP") in TOR Messenger (an open source chat communications messaging platform; herein, the term "TOR," whose name is originally based on "the onion router," will simply be referred to as non-acronym "TOR" or "Tor"), the secure OTR communications described herein for IoT applications ensures that communications between or amongst IoT capable devices are neither recorded nor logged. Rather than the TOR network that is used by Tor Messenger, the secure OTR communications utilize a service provider's network for transport of IoT protocol-based OTR communications. In some embodiments, similar to malleable chat OTR, secure OTR communications amongst the IoT capable devices might utilize one or more of malleable encryption, forward secrecy, deniable authentication, and/or the like. Lightweight protocols are used to take into account the highly limited memory or RAM resources in some IoT sensors, devices, and/or endpoints, while offloading encryption and resource-intensive processing. The intent is to be able to provide additional layers of security across traditionally non-secure protocols, such as HTTP, non-transport layer security ("non-TLS") channels, as well as across encrypted links (such as links using AES256 or greater encryption algorithms, or the like). This allows for security best practices and regulatory compliance with statutory, governmental, standards, or other frameworks including, but not limited to, the Health Insurance Portability and Accountability Act ("HIPAA"), the Payment Card Industry Data Security Standard ("PCI-DSS"), the Sarbanes-Oxley Act ("SOX"), the Communications Assistance for Law Enforcement Act ("CALEA"), and/or the like, while allowing for new standards to be defined that relate to data and/or communications hardening.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, device-to-device communications technology, IoT communications technology, network security technology, network privacy protection technology, and/or the like. In other aspects, certain embodiments, can improve the functioning of user equipment or systems themselves (e.g., telecommunications equipment, network components, etc.), for example, by protecting communications between IoT endpoint devices or IoT capable devices, thereby protecting privacy or security of the IoT network or other network to which the IoT capable devices are connected, and/or the like. In particular, to the extent any abstract concepts are present in the various embodiments, those concepts can be implemented as described herein by devices, software, systems, and methods that involve specific novel functionality (e.g., steps or operations), such as establishing a secure off-the-record ("OTR") communication session within the IoT protocol-based, machine-to-machine communication channel amongst two or more IoT capable devices, and/or the like, to name a few examples, that extend beyond mere conventional computer processing operations. These functionalities can produce tangible results outside of the implementing computer system, including, merely by way of example, preventing recording or logging of content of communications over a secure OTR communication channel amongst two or more IoT capable devices, which may be observed or measured by customers and/or service providers.

In an aspect, a method might comprise providing, with a computing device, connectivity between a first device and a second device over at least one network, by establishing an Internet-of-Things ("IoT") protocol-based, machine-to-machine communication channel between the first device and the second device over the at least one network that allows autonomous machine-to-machine communications between the first device and the second device, without any user interaction or any user input during the autonomous machine-to-machine communications. The method might further comprise establishing, with the computing device, a secure off-the-record ("OTR") communication session within the IoT protocol-based, machine-to-machine communication channel between the first device and the second device over the at least one network, the secure OTR communication session providing encrypted machine-to-machine communications between the first device and the second device, without any content of communications that is exchanged between the first device and the second device over the secure OTR communication session being recorded or logged.

In some embodiments, the content of communications that is exchanged between the first device and the second device over the secure OTR communication session might comprise at least one of information about the first device, information about the second device, information about a user associated with the first device, information about a user associated with the second device, information about dates or times of the communications exchanged between the first device and the second device over the secure OTR communication session, or one or more of data content, text content, recorded voice content, image content, video content, sensor data content, or instruction content of the communications exchanged between the first device and the second device over the secure OTR communication session, and/or the like.

In some instances, the method might further comprise determining, with the computing device, whether one or more data packets of the plurality of data packets from the at least one of the first device and the second device contain sensitive information. In such cases, establishing the secure OTR communication session might be based at least in part on a determination that one or more data packets of the plurality of data packets from the at least one of the first device and the second device contain sensitive information. Alternatively, the method might further comprise receiving, with the computing device, an indication from at least one of the first device and the second device that at least one data packet of the plurality of data packets will likely contain sensitive information. In such cases, establishing the secure OTR communication session might be based at least in part on receiving the indication that at least one data packet of the plurality of data packets will likely contain sensitive information. In either case, the sensitive information might include at least one of information about a user associated with at least one of the first device or the second device, information associated with a customer premises associated with the user who is associated with the at least one of the first device or the second device, information associated with communications protocols used by one or both of the first device or the second device, or information about other users who are associated with the customer premises associated with the user who is associated with the at least one of the first device or the second device, and/or the like.

Merely by way of example, according to some embodiments, the secure OTR communication session might be based at least in part on off-the-record messaging protocol. Alternatively, or additionally, the secure OTR communication session might utilize one or more cryptographic protocols or techniques selected from a group consisting of AES symmetric-key algorithm, Diffie-Hellman key exchange, SHA-1 hash function, forward secrecy, deniable authentication, and malleable encryption, and/or the like. In some cases, the IoT protocol-based, machine-to-machine communication channel might be established using an IoT protocol, the secure OTR communication session might be established using an OTR communication protocol, and the OTR communication protocol might be part of the IoT protocol.

The computing device, in some embodiments, might comprise a gateway device including, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and/or the like, and the gateway device might be located at or near a customer premises associated with a user who is associated with one of the first device or the second device. Alternatively, the computing device might comprise at least one of an optical network terminal ("ONT"), a network interface device ("NID"), an enhanced NID ("eNID"), or a server computer, and/or the like, each of which is controlled by a network service provider. In some instances, the computing device might be one of the first device or the second device.

According to some embodiments, the first device and the second device each might comprise one of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like. The first device and the second device, in some cases, might be located in proximity to each other. Alternatively, the first device and the second device might be located at different geographic locations, and establishing the secure OTR communication session might comprise establishing, with the computing device, a secure OTR communication session between the first device and the second device over the at least one network via one or more intermediary devices. In some instances, the at least one network might comprise one or more of a local area network ("LAN"), a wide area network ("WAN"), a wireless wide area network ("WWAN"), a virtual private network ("VPN"), the Internet, or an extranet, and/or the like.

In another aspect, a computing device might comprise at least one processor and a non-transitory computer readable medium communicatively coupled to the at least one processor. The non-transitory computer readable medium might have stored thereon computer software comprising a set of instructions that, when executed by the at least one processor, causes the computing device to: provide connectivity between a first device and a second device over at least one network, by establishing an Internet-of-Things ("IoT") protocol-based, machine-to-machine communication channel between the first device and the second device over the at least one network that allows autonomous machine-to-machine communications between the first device and the second device, without any user interaction or any user input during the autonomous machine-to-machine communications; and establish a secure off-the-record ("OTR") communication session within the IoT protocol-based, machine-to-machine communication channel between the first device and the second device over the at least one network, the secure OTR communication session providing encrypted machine-to-machine communications between the first device and the second device, without any content of communications that is exchanged between the first device and the second device over the secure OTR communication session being recorded or logged.

In some instances, the secure OTR communication session might be based at least in part on off-the-record messaging protocol. Alternatively, or additionally, the secure OTR communication session might utilize one or more cryptographic protocols or techniques selected from a group consisting of AES symmetric-key algorithm, Diffie-Hellman key exchange, SHA-1 hash function, forward secrecy, deniable authentication, and malleable encryption, and/or the like.

In yet another aspect, an Internet-of-Things ("IoT") capable device might be provided. The IoT capable device might comprise at least one processor and a non-transitory computer readable medium communicatively coupled to the at least one processor. The non-transitory computer readable medium might have stored thereon computer software comprising a set of instructions that, when executed by the at least one processor, causes the IoT capable device to send information to a second IoT capable device over a secure off-the-record ("OTR") communication session that is established within an IoT protocol-based, machine-to-machine communication channel between the IoT capable device and the second IoT capable device over at least one network, the secure OTR communication session providing encrypted machine-to-machine communications between the IoT capable device and the second IoT capable device, without the information being recorded or logged.

In some embodiments, the information might comprise at least one of information about the IoT capable device, information about the second IoT capable device, information about a user associated with the IoT capable device, information about a user associated with the second IoT capable device, information about dates or times of the communications exchanged between the IoT capable device and the second IoT capable device over the secure OTR communication session, or one or more of data content, text content, recorded voice content, image content, video content, sensor content, or instruction content of the communications exchanged between the IoT capable device and the second IoT capable device over the secure OTR communication session, and/or the like.

Merely by way of example, the IoT capable device and the second IoT capable device might each comprise one of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like.

According to some embodiments, the secure OTR communication session might be based at least in part on off-the-record messaging protocol. Alternatively, or additionally, the secure OTR communication session might utilize one or more cryptographic protocols or techniques selected from a group consisting of AES symmetric-key algorithm, Diffie-Hellman key exchange, SHA-1 hash function, forward secrecy, deniable authentication, and malleable encryption, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing communications for Internet of Things ("IoT") devices, and, in particular embodiments, to methods, systems, apparatus, and computer software for implementing secure communications for IoT devices, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Figure 2:
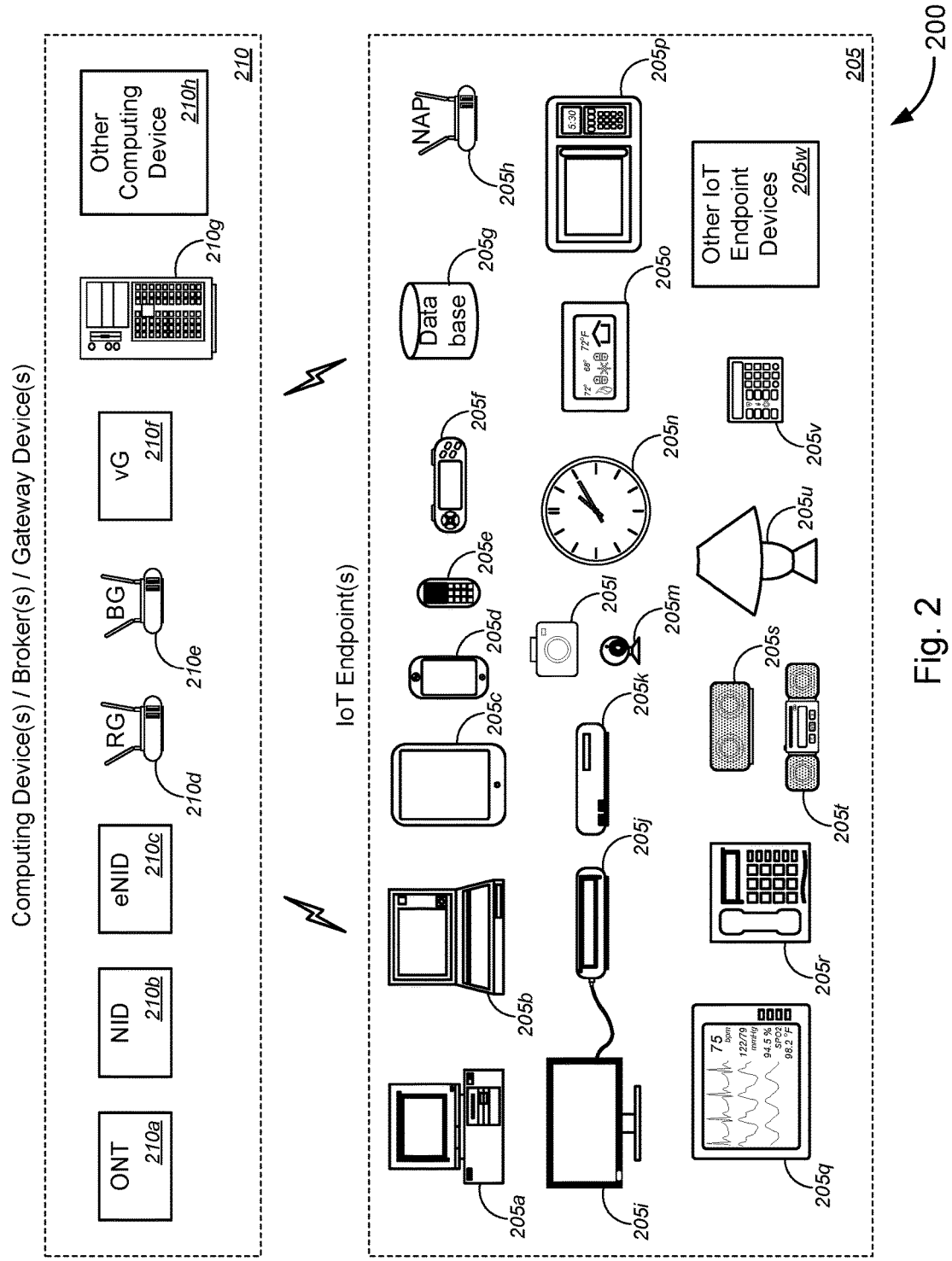
FIG. 2 is a schematic diagram illustrating a system comprising various examples of IoT Endpoints that can utilize the secure communications, in accordance with various embodiments, in some cases, via a computing device, several examples of which are shown.

With reference to the figures, FIG. 1 is a schematic diagram illustrating a system 100 for implementing secure communications for Internet of Things ("IoT") devices, in accordance with various embodiments. In the non-limiting embodiment of FIG. 1, system 100 might comprise a first IoT Endpoint 105 and a second IoT Endpoint 110. In some embodiments, the first IoT Endpoint 105 and the second IoT Endpoint 110 might each include, but are not limited to, one of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like. FIG. 2 also describes other embodiments of IoT Endpoints. The various embodiments, however, are not limited to the specific examples as described with reference to FIGS. 1 and 2, and can be implemented with any IoT Endpoint, as appropriate or as desired.

System 100 might further comprise a computing system 115, which might communicatively couple to each of the first IoT Endpoint 105 and the second IoT Endpoint 110 via network 120 and, in some cases, via one or more telecommunications relay systems 125. The computing system 115, according to some embodiments, might include, without limitation, one or more of an optical network terminal ("ONT"), a network interface device ("NID"), an enhanced NID ("eNID"), a residential gateway ("RG") device, a business gateway ("BG") device, a virtual gateway ("vG") device, a server computer, and/or other computing device, or the like. In some cases, the other computing device might itself be one of the first IoT Endpoint 105 or the second IoT Endpoint 110. In some cases, the network 120 might include, but is not limited to, one or more of a local area network ("LAN"), a wide area network ("WAN"), a wireless wide area network ("WWAN"), a virtual private network ("VPN"), the Internet, or an extranet, and/or the like. Other networks that can be implemented as network 120 are described below with reference to FIG. 6. The one or more telecommunications relay systems 125 might include, without limitation, one or more wireless network interfaces (e.g., wireless modems, wireless access points, and the like), one or more towers, one or more satellites, and/or the like.

System 100, in some aspects, might further comprise a data lake 130, an analytics engine 135, one or more application service providers ("ASPs") or ASP servers 145, and/or one or more user devices 155. Each of the analytics engine 135, the one or more ASP servers 145, and the one or more user devices 155 might communicatively couple to the data lake 130 via the network 120 (in some cases, via the one or more telecommunications relay systems 125). The analytics engine 135 might, in some instances, communicatively couple to database 140 (which might be local to, or remote from, the analytics engine 135). The one or more ASP servers 145 might, in some cases, individually communicatively couple to each of databases 150 (which might be local to, or remote from, each of the one or more ASP servers 145) or collectively communicatively couple to one or more of databases 150 (at least one of which might be local to one of the one or more ASP servers 145, or all of which might be remote from each of the one or more ASP servers 145). In some embodiments, the one or more user devices 155 might include, without limitation, a desktop computer 155*a*, a laptop computer 155*b*, and/or one or more mobile user devices 160. The one or more mobile user devices 160 might include, but are not limited to, a tablet computer 160*a*, a smart phone 160*b*, a mobile phone 160*c*, a portable gaming device 160*d*, and/or the like.

In operation, one of the first IoT Endpoint 105 and the second IoT Endpoint 110 might communicate with the other of the first IoT Endpoint 105 and the second IoT Endpoint 110 over an IoT protocol-based, machine-to-machine communication channel over the network 120. The IoT protocol-based, machine-to-machine communication channel allows for autonomous machine-to-machine communications between the first IoT Endpoint 105 and the second IoT Endpoint 110, without any user interaction or any user input during the autonomous machine-to-machine communications. In some cases, the IoT protocol-based, machine-to-machine communication channel might be established by or via the computing device 115. In some embodiments, particularly for sensitive or secure information exchange, the computing device 115 might establish a secure off-the-record ("OTR") communication session within the IoT protocol-based, machine-to-machine communication channel between the first IoT Endpoint 105 and the second IoT Endpoint 110. The secure OTR communication session provides encrypted machine-to-machine communications between the first IoT Endpoint 105 and the second IoT Endpoint 110, without any content of communications that is exchanged between the first IoT Endpoint 105 and the second IoT Endpoint 110 over the secure OTR communication session being recorded or logged.

In some embodiments, the secure OTR communication session is based at least in part on off-the-record messaging protocol. Alternatively, or additionally, the secure OTR communication session utilizes one or more cryptographic protocols or techniques selected from a group consisting of AES symmetric-key algorithm, Diffie-Hellman key exchange, SHA-1 hash function, forward secrecy, deniable authentication, and malleable encryption, and/or the like. In some instances, the IoT protocol-based, machine-to-machine communication channel is established using an IoT protocol, while the secure OTR communication session is established using an OTR communication protocol, and the OTR communication protocol is part of the IoT protocol.

Merely by way of example, in some cases, other communications or messaging protocols (and/or systems) may be implemented, including, but not limited to, one or more of MQ telemetry transport ("MQTT"; which is a publish-subscribe-based messaging protocol), extensible messaging and presence protocol ("XMPP"; which is a communications protocol for message-oriented middleware based on extensible markup language ("XML")), universal plug and play ("UPnP"; which is a set of networking protocols that allows for seamless discover of networked devices and for establishment of functional network services for data sharing, communications, and entertainment amongst the discovered and connected devices), data distribution service ("DDS"; which is an machine-to-machines middleware ("m2m") standard for enabling scalable, real-time, dependable, high-performance, and interoperable data exchanges between publishers and subscribers), advanced message queuing protocol ("AMQP"; which is an open standard application layer protocol for message-oriented middleware), constrained application protocol ("CoAP"; which is a software protocol that allows simple electronics devices to communicate interactively over a network (e.g., Internet)), secure hypertext transfer protocol ("HTTPS"; which is a protocol for secure communication over a computer network), supervisory control and data acquisition ("SCADA"; which is a system for remote monitoring and control that operates with coded signals over communication channels), and/or the like.

According to some embodiments, the first IoT Endpoint 105 and the second IoT Endpoint 110 might be located in proximity to each other (e.g., in the same customer premises, within line of sight, within wireless communications range, and/or the like). Alternatively, the first IoT Endpoint 105 and the second IoT Endpoint 110 might be located at different geographic locations, and establishing the secure OTR communication session might comprise establishing, with the computing device 115, a secure OTR communication session between the first IoT Endpoint 105 and the second IoT Endpoint 110 over the network 120 via one or more intermediary devices (e.g., via the one or more telecommunications relay systems 125, servers, network switches, other intermediary devices, or the like).

In some embodiments, the content of communications that is exchanged between the first IoT Endpoint 105 and the second IoT Endpoint 110 over the secure OTR communication session includes, without limitation, at least one of information about the first IoT Endpoint 105, information about the second IoT Endpoint 110, information about a user associated with the first IoT Endpoint 105, information about a user associated with the second IoT Endpoint 110, information about dates or times of the communications exchanged between the first IoT Endpoint 105 and the second IoT Endpoint 110 over the secure OTR communication session, or one or more of data content, text content, recorded voice content, image content, video content, sensor data content, or instruction content of the communications exchanged between the first IoT Endpoint 105 and the second IoT Endpoint 110 over the secure OTR communication session, and/or the like.

The data lake 130, according to some embodiments, might store characteristics of the communications (but not the content of the communications) that are exchanged between the first IoT Endpoint 105 and the second IoT Endpoint 110 over the secure OTR communication session. For non-OTR communications, the data lake 130 may store content of the communications in addition to the characteristics of the communications, according to customary data collection patterns (which may be based at least in part on user preferences, service provider defaults, and/or the like). The analytics engine 135 might analyze the characteristics of the communications (but not the content of the communications), which may be retrieved or otherwise accessed from the data lake 130, to ensure secure transmission of data or other content during the secure OTR communication session. The analytics engine 135 might store the characteristics of the communications and/or the resultant analysis of the characteristics of the communications in database 140.

The one or more ASP servers 145 might receive, retrieve, or otherwise access, from data lake 130, notifications, data, updates, content, and/or the like that are associated with the characteristics of the communications (but not the content of the communications), as a result of the secure communications between the first IoT Endpoint 105 and the second IoT Endpoint 110, particularly, those notifications, data, updates, content, and/or the like that might be determined (e.g., by the computing device 115, and/or the like) to be pertinent to ASPs, as feedback or the like for improving existing apps or software for the IoT Endpoints 105 and/or 110 (or for improving communications in general, or the like), for developing new apps or software for the IoT Endpoints 105 and/or 110, for improving and/or developing user interfaces for user devices 155 for interacting with, setting up, and/or selecting preferences associated with each of the first IoT Endpoint 105 and/or the second IoT Endpoint 110, and/or the like.

The one or more user devices 155, in some cases, might receive, retrieve, or otherwise access, from data lake 130, notifications, data, updates, content, and/or the like that are associated with the characteristics of the communications (but not the content of the communications), as a result of the secure communications between the first IoT Endpoint 105 and the second IoT Endpoint 110, particularly, those notifications, data, updates, content, and/or the like that might be determined (e.g., by the computing device 115, and/or the like) to be pertinent to the user(s) associated with the one or more user devices 155.

Although two IoT Endpoints are shown and described with respect to FIG. 1, the various embodiments are not so limited, and any suitable number of IoT Endpoints may be implemented, with communications between two such IoT Endpoints at a time (in a manner similar to that as described above with respect to FIG. 1), or amongst two or more such IoT Endpoints at a time (as described below with respect to FIGS. 2 and 3).

FIG. 2 is a schematic diagram illustrating a system 200 comprising various examples of IoT Endpoints that can utilize the secure communications, in accordance with various embodiments, in some cases, via a computing device, several examples of which are shown. In the non-limiting embodiment of FIG. 2, system 200 might comprise two or more IoT endpoints 205 and one or more computing devices/brokers/gateway devices 210 that are communicatively coupled—in some cases, via wireless communications, which might include, without limitation, IoT communications protocol, and/or the like (as represented, for example, by the lightning bolts in FIG. 2).

In some embodiments, the two or more IoT endpoints 205 might each include, without limitation, one of a desktop computer 205a, a laptop computer 205b, a tablet computer 205c, a smart phone 205d, a mobile phone 205e, a portable gaming device 205f, a database or data storage device 205g, a network access point ("NAP") 205h, a television or monitor 205i, a set-top box ("STB") 205j, a gaming console 205k, an image capture device 205l, a video capture device 205m, a time piece 205n (including, without limitation, a clock, a watch, or other time piece, and the like), a thermostat or environmental control system 205o, a kitchen appliance 205p (including, but not limited to, a microwave oven, a refrigerator, an oven, a range, a stove, an induction cooktop, a pressure cooker, a rice cooker, a bread maker, a coffee machine, a kettle, a dishwasher, a food thermometer, and/or the like), a medical device 205q, a telephone system 205r, a speaker 205s, a media recording and/or playback device 205t, a lighting system 205u, a customer premises security control system 205v, and/or other IoT endpoint devices 205w. In some cases, the other IoT endpoint devices 205w might include, without limitation, a personal digital assistant, a fitness tracking device, a printer, a scanner, an image projection device, a video projection device, a vehicle, an audio headset, sensing device (e.g., temperature sensor, light sensor, audio sensor, motion sensor, proximity sensor, carbon monoxide sensor, smoke detector, and/or the like), a door locking system, a window locking system, a window covering system, a sprinkler system, and/or the like.

According to some embodiments, the one or more computing devices/brokers/gateway devices 210 might each include, but are not limited to, an optical network terminal ("ONT") 210a, a network interface device ("NID") 210b, an enhanced NID ("eNID") 210c, a residential gateway ("RG") device 210d, a business gateway ("BG") device 210e, a virtual gateway ("vG") device 210f, a server computer 210g, and/or other computing device 210h. In some cases, the other computing device 210h might be one of the IoT Endpoints 205.

In operation, one of the IoT Endpoints 205 might communicate with one or more others of the IoT Endpoints 205 over an IoT protocol-based, machine-to-machine communication channel (which allows for autonomous machine-to-machine communications amongst the two or more IoT Endpoints 205, without any user interaction or any user input during the autonomous machine-to-machine communications). In some cases, the IoT protocol-based, machine-to-machine communication channel might be established by or via the one or more computing devices/brokers/gateway devices 210. In some embodiments, particularly for sensitive or secure information exchange, the one or more computing devices/brokers/gateway devices 210 might establish a secure off-the-record ("OTR") communication session within the IoT protocol-based, machine-to-machine communication channel amongst the two or more IoT Endpoints 205. The secure OTR communication session provides encrypted machine-to-machine communications amongst the two or more IoT Endpoints 205, without any content of communications that is exchanged amongst the two or more IoT Endpoints 205 over the secure OTR communication session being recorded or logged.

Figure 3:
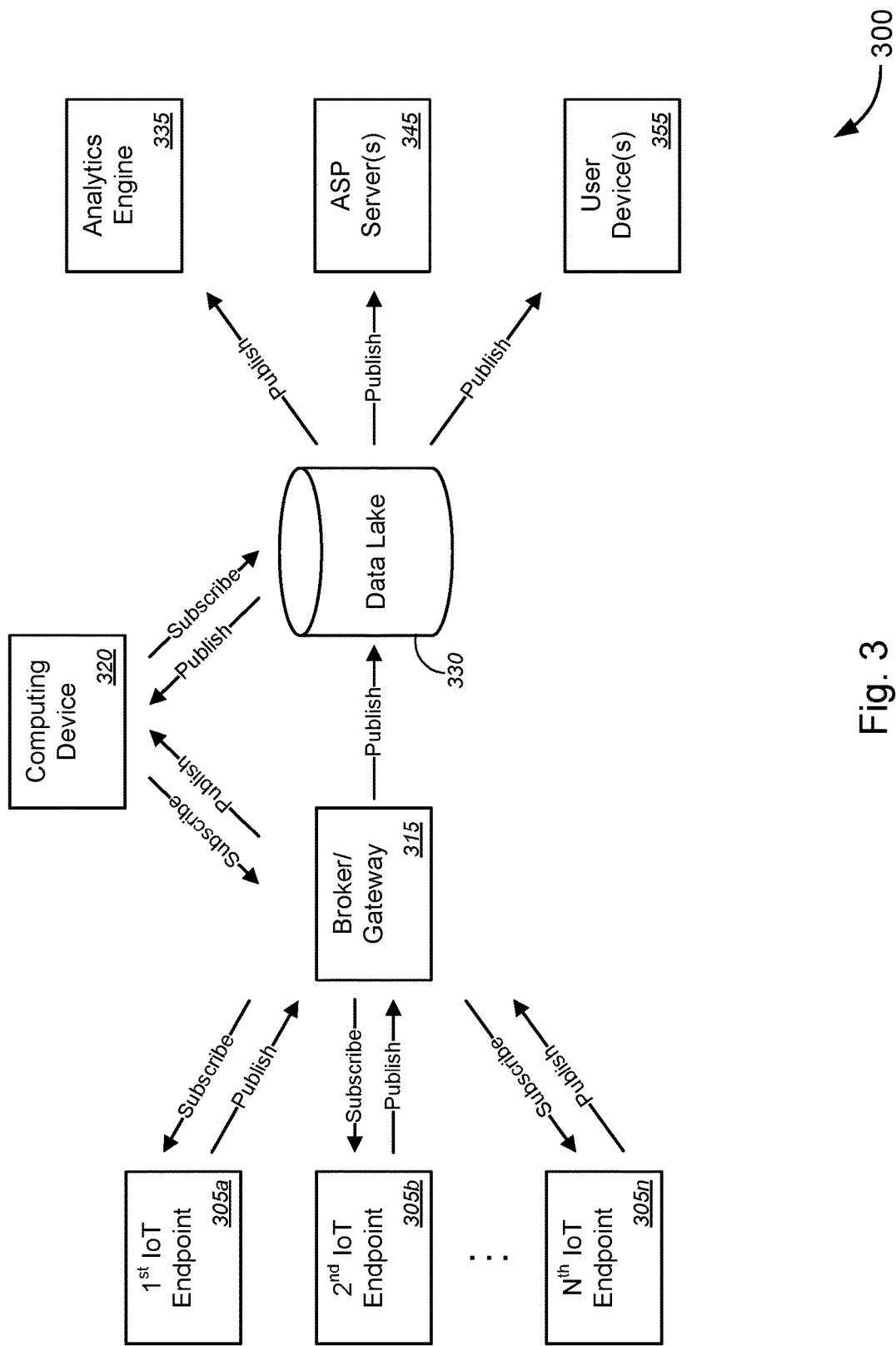
FIG. 3 is a schematic diagram illustrating another system for implementing secure communications for IoT devices, in accordance with various embodiments.

FIG. 3 is a schematic diagram illustrating another system 300 for implementing secure communications for IoT devices, in accordance with various embodiments. In FIG. 3, system 300 might comprise a first IoT Endpoint device 305a, a second IoT Endpoint device 305b, through an $N^{th}$ IoT Endpoint device 305n (collectively, "IoT Endpoint(s)" or "IoT Endpoint device(s)" 305). Each IoT Endpoint 305— which might correspond to one of the IoT Endpoints 105, 110, or 205 of FIGS. 1 and 2—might, for example, include, without limitation, one of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like.

System 300 might further comprise a broker/gateway device 315 (which might correspond to one of computing device 115 or 210, or broker/gateway 210 of FIGS. 1 and 2, and/or the like), a computing device 320 (which might also correspond to one of computing device 115 or 210, or broker/gateway 210 of FIGS. 1 and 2, and/or the like), a data lake 330 (which might correspond to data lake 130 of FIG. 1, and/or the like), an analytics engine (which might correspond to analytics engine 135 of FIG. 1, and/or the like), one or more ASPs or ASP servers 345 (which might correspond to ASP server 145 of FIG. 1, and/or the like), and one or more user devices 355 (which might correspond to user devices 155 or mobile user devices 160 of FIG. 1, and/or the like).

Merely by way of example, the broker/gateway device 315 or the computing device 320 might, in some embodiments, comprise a gateway device including, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and the gateway device is located at or near a customer premises associated with a user associated with one of the first through $N^{th}$ IoT Endpoints 305a-305n. Alternatively, or additionally, the broker/gateway device 315 or the computing device 320 might include, but is not limited to, at least one of an ONT, a NID, an eNID, or a server computer, each of which is controlled by a network service provider. In yet other embodiments, the broker/gateway device 315 or the computing device 320 might itself be one of the first through $N^{th}$ IoT Endpoints 305a-305n. The one or more user devices 355 might include, but are not limited to, desktop computers, laptop computers, tablet computers, smart phones, mobile phones, portable gaming devices, and/or the like.

In operation, similar to the system 100 of FIG. 1, the broker/gateway device 315 or the computing device 320 might provide connectivity between or amongst two or more IoT Endpoints 305 of the first through $N^{th}$ IoT Endpoints 305a-305n, by establishing an IoT protocol-based, machine-to-machine communication channel between or amongst the two or more IoT Endpoints 305 that allows autonomous machine-to-machine communications amongst the two or more IoT Endpoints 305, without any user interaction or any user input during the autonomous machine-to-machine communications. According to some embodiments, the broker/gateway device 315 or the computing device 320 might establish a secure off-the-record ("OTR") communication session within the IoT protocol-based, machine-to-machine communication channel amongst the two or more IoT Endpoints 305. The secure OTR communication session provides encrypted machine-to-machine communications amongst the two or more IoT Endpoints 305, without any content of communications that is exchanged amongst the two or more IoT Endpoints 305 over the secure OTR communication session being recorded or logged.

In some cases, the content of communications that is exchanged amongst the two or more IoT Endpoints 305 over the secure OTR communication session includes, without limitation, at least one of information about one of the two or more IoT Endpoints 305, information about a user associated with the one of the two or more IoT Endpoints 305, information about dates or times of the communications exchanged amongst the two or more IoT Endpoints 305 over the secure OTR communication session, or one or more of data content, text content, recorded voice content, image content, video content, sensor data content, or instruction content of the communications exchanged amongst the two or more IoT Endpoints 305 over the secure OTR communication session, and/or the like.

The data lake 330, according to some embodiments, might store characteristics of the communications (but not the content of the communications) that are exchanged amongst the two or more IoT Endpoints 305 over the secure OTR communication session. The analytics engine 335 might analyze the characteristics of the communications (but not the content of the communications), which may be retrieved or otherwise accessed from the data lake 330, to ensure secure transmission of data or other content during the secure OTR communication session. The one or more ASP servers 345 might receive, retrieve, or otherwise access, from data lake 330, notifications, data, updates, content, and/or the like that are associated with the characteristics of the communications (but not the content of the communications), as a result of the secure communications amongst the two or more IoT Endpoints 305, particularly, those notifications, data, updates, content, and/or the like that might be determined (e.g., by the broker/gateway device 315 or the computing device 320, and/or the like) to be pertinent to ASPs, as feedback or the like for improving existing apps or software for the IoT Endpoints 305 (or for improving communications in general, or the like), for developing new apps or software for the IoT Endpoints 305, for improving and/or developing user interfaces for user devices 355 for interacting with, setting up, and/or selecting preferences associated with each of the two or more IoT Endpoints 305, and/or the like.

The one or more user devices 355, in some cases, might receive, retrieve, or otherwise access, from data lake 330, notifications, data, updates, content, and/or the like that are associated with the characteristics of the communications (but not the content of the communications), as a result of the secure communications amongst the two or more IoT Endpoints 305, particularly, those notifications, data, updates, content, and/or the like that might be determined (e.g., by the broker/gateway device 315 or the computing device 320, and/or the like) to be pertinent to the user(s) associated with the one or more user devices 355.

In some embodiments, the secure OTR communication session is based at least in part on off-the-record messaging protocol. Alternatively, or additionally, the secure OTR communication session utilizes one or more cryptographic protocols or techniques selected from a group consisting of AES symmetric-key algorithm, Diffie-Hellman key exchange, SHA-1 hash function, forward secrecy, deniable authentication, and malleable encryption, and/or the like. In some instances, the IoT protocol-based, machine-to-machine communication channel is established using an IoT protocol, while the secure OTR communication session is established using an OTR communication protocol, and the OTR communication protocol is part of the IoT protocol. Merely by way of example, in some cases, other communications or messaging protocols (and/or systems) may be implemented, including, but not limited to, one or more of MQ telemetry transport ("MQTT"), extensible messaging and presence protocol ("XMPP"), universal plug and play ("UPnP"), data distribution service ("DDS"), advanced message queuing protocol ("AMQP"), constrained application protocol ("CoAP"), secure hypertext transfer protocol ("HTTPS"), supervisory control and data acquisition ("SCADA"), and/or the like.

According to some embodiments, the two or more IoT Endpoints 305 might be located in proximity to each other (e.g., in the same customer premises, within line of sight, within wireless communications range, and/or the like). Alternatively, the two or more IoT Endpoints 305 might be located at different geographic locations, and establishing the secure OTR communication session might comprise establishing, with the broker/gateway device 315 or the computing device 320, a secure OTR communication session amongst the two or more IoT Endpoints 305 via one or more intermediary devices, or the like.

Merely by way of example, in some aspects, a publish/subscribe or pub/sub scheme might be implemented. Herein, "publish/subscribe" or "pub/sub" might refer to a messaging pattern in which senders of messages (called "publishers") publish messages into classes—in some cases, without knowledge of which subscribers, if any, there may be —, and receivers of the messages (called "subscribers") express interest in one or more classes of messages and only receive messages that are of interest—in some cases, without knowledge of which publishers, if any, there may be. As shown in the non-limiting embodiment of FIG. 3, each of the IoT Endpoints 305 might subscribe to the broker/gateway 315, and might also publish to the broker/gateway 315. The messages that are received by the subscriber IoT Endpoints 305 and the messages that are published by the publisher IoT Endpoints 305 might include, without limitation, the content of messages (that during the OTR communication session, would not themselves be recorded or logged anywhere, but that during a non-OTR communication session may be recorded or logged in a database (e.g., data lake 330)), characteristics of the communications (which are separate from the content of communications), and/or the like.

The broker/gateway 315 might publish characteristics of the communications to the data lake 330. For non-OTR communications, the broker/gateway 315 may also publish some or all of the content of the communications amongst two or more of the IoT Endpoints 305 and/or communications between one of the IoT Endpoints 305 and the broker/gateway 315. In some embodiments, the broker/gateway publish characteristics of the communications (and, for non-OTR communications, may also publish some or all of the content of the communications amongst two or more of the IoT Endpoints 305 and/or communications between one of the IoT Endpoints 305 and the broker/gateway 315) to the computing device 320 (if any are implemented in system 300). The broker/gateway 315, in some cases, may also subscribe to the computing device 320 (if any are implemented in system 300). In those embodiments in which the computing device 320 is implemented, the computing device 320 might subscribe to the data lake 330, and might also publish to the data lake 330. The data lake 330 might publish to each of the analytics engine 335, the one or more ASP servers 345, and the one or more user devices 355. Each communication path (i.e., a path between one IoT endpoint 305 and the broker/gateway 315, a path between the broker/ gateway 315 and the computing device 320, a path between the broker/gateway 315 and the data lake 330, a path between the computing device 320 and the data lake 330, a path between the data lake 330 and each of the analytics engine 335, each ASP server 345, or each user device 355) leverages OTR communications through their respective IoT protocol.

Figure 4A:
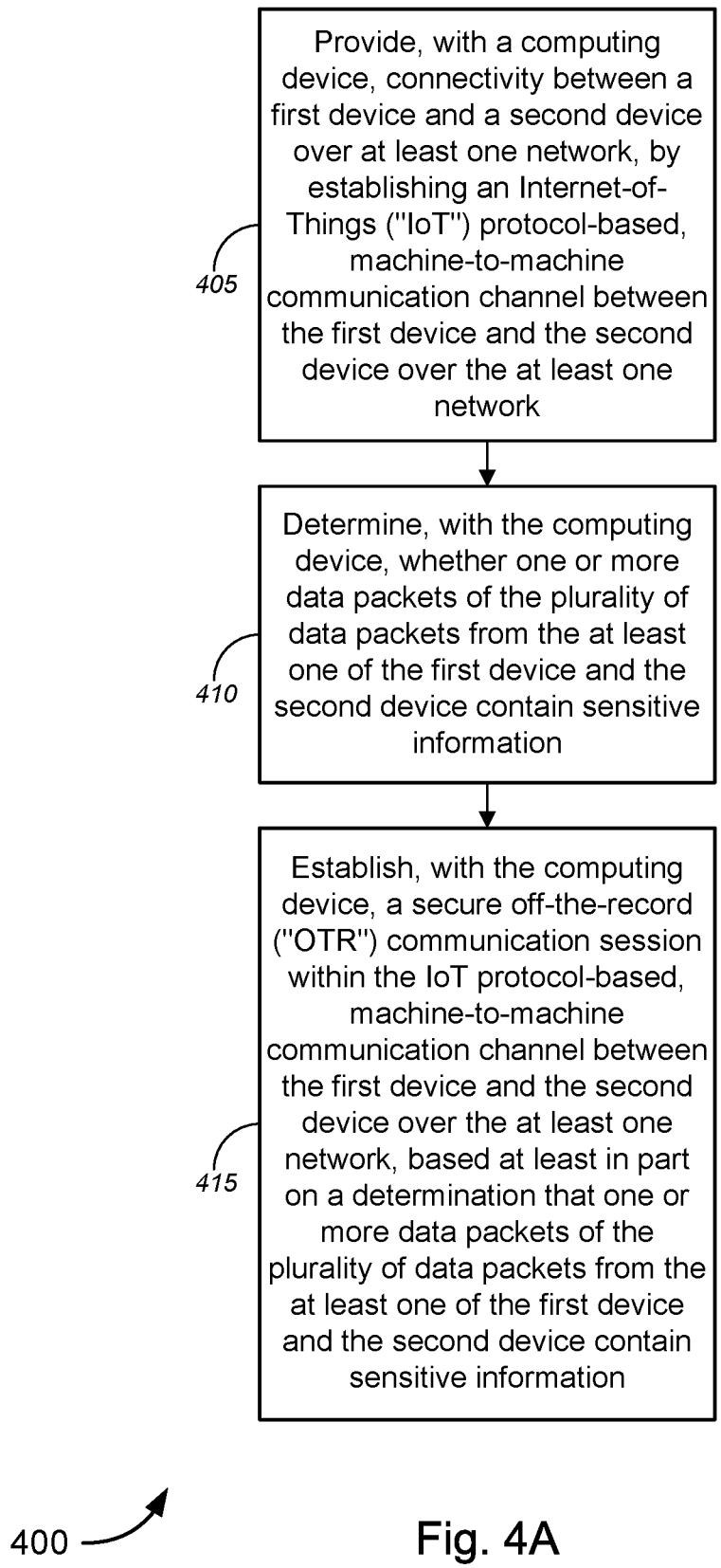
FIGS. 4A and 4B are flow diagrams illustrating various methods for implementing secure communications for IoT devices, in accordance with various embodiments.
Figure 4B:
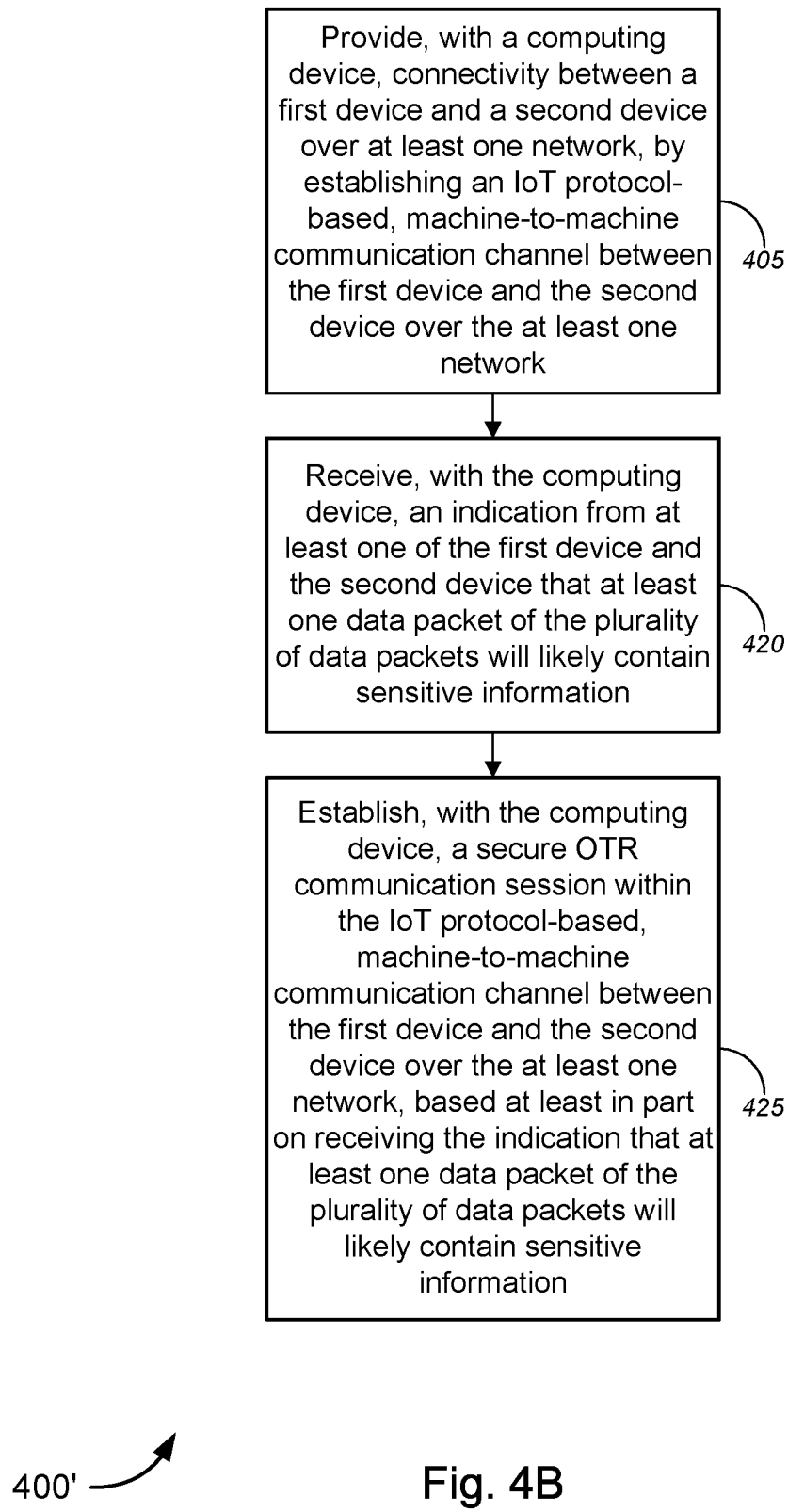

FIGS. 4A and 4B (collectively, "FIG. 4") are flow diagrams illustrating various methods 400 and 400' for implementing secure communications for IoT devices, in accordance with various embodiments. While the techniques and procedures are depicted and/or described in a certain order for purposes of illustration, it should be appreciated that certain procedures may be reordered and/or omitted within the scope of various embodiments. Moreover, while the method 400 or 400' illustrated by FIG. 4 can be implemented by or with (and, in some cases, are described below with respect to) the systems 100, 200, and 300 of FIGS. 1, 2, and 3, respectively (or components thereof), such methods may also be implemented using any suitable hardware (or software) implementation. Similarly, while each of the systems 100, 200, and 300 of FIGS. 1, 2, and 3, respectively (or components thereof), can operate according to the method 400 or 400' illustrated by FIG. 4 (e.g., by executing instructions embodied on a computer readable medium), the systems 100, 200, and 300 of FIGS. 1, 2, and 3 can each also operate according to other modes of operation and/or perform other suitable procedures.

Turning to FIG. 4A, method 400, at block 405, might comprise providing, with a computing device (e.g., computing device 115, 210, or 320, or broker/gateway 210 or 315 of FIGS. 1-3, and/or the like), connectivity between a first device (e.g., one or more of IoT Endpoints 105, 110, 205, and/or 305 of FIGS. 1-3, and/or the like) and a second device (e.g., another one or more of IoT Endpoints 105, 110, 205, and/or 305 of FIGS. 1-3, and/or the like) over at least one network (e.g., network 120 of FIG. 1, and/or the like), by establishing an IoT protocol-based, machine-to-machine communication channel between the first device and the second device over the at least one network that allows autonomous machine-to-machine communications between the first device and the second device, without any user interaction or any user input during the autonomous machine-to-machine communications.

In some embodiments, the computing device might comprise a gateway device including, without limitation, at least one of an optical network terminal ("ONT"), a network interface device ("NID"), an enhanced NID ("eNID"), a residential gateway ("RG") device, a business gateway ("BG") device, or a virtual gateway ("vG") device, and the gateway device is located at or near a customer premises associated with a user associated with one of the first device or the second device. Alternatively, or additionally, the computing device might include, but is not limited to, at least one of an ONT, a NID, an eNID, or a server computer, each of which is controlled by a network service provider. In yet other embodiments, the computing device might itself be one of the first device or the second device.

Merely by way of example, according to some embodiments, the first device and the second device might each include, without limitation, one of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like. In some cases, the at least one network might include, but is not limited to, one or more of a local area network ("LAN"), a wide area network ("WAN"), a wireless wide area network ("WWAN"), a virtual private network ("VPN"), the Internet, or an extranet, and/or the like.

At block 410, method 400 might further comprise determining, with the computing device, whether one or more data packets of the plurality of data packets from the at least one of the first device and the second device contain sensitive information. In some embodiments, the sensitive information might include, without limitation, at least one of information about a user associated with at least one of the first device or the second device, information associated with a customer premises associated with the user associated with the at least one of the first device or the second device, information associated with communications protocols used by one or both of the first device or the second device, or information about other users who are associated with the customer premises associated with the user associated with the at least one of the first device or the second device, and/or the like.

Based at least in part on a determination (by the computing device) that one or more data packets of the plurality of data packets from the at least one of the first device and the second device contain sensitive information, method 400 might further comprise establishing, with the computing device, a secure off-the-record ("OTR") communication session within the IoT protocol-based, machine-to-machine communication channel between the first device and the second device over the at least one network (block 415). The secure OTR communication session provides encrypted machine-to-machine communications between the first device and the second device, without any content of communications that is exchanged between the first device and the second device over the secure OTR communication session being recorded or logged.

Merely by way of example, in some cases, the content of communications that is exchanged between the first device and the second device over the secure OTR communication session might include, but is not limited to, at least one of information about the first device, information about the second device, information about a user associated with the first device, information about a user associated with the second device, information about dates or times of the communications exchanged between the first device and the second device over the secure OTR communication session, or one or more of data content, text content, recorded voice content, image content, video content, sensor data content, or instruction content of the communications exchanged between the first device and the second device over the secure OTR communication session, and/or the like.

According to some embodiments, the secure OTR communication session is based at least in part on off-the-record messaging protocol. Alternatively, or additionally, the secure OTR communication session utilizes one or more cryptographic protocols or techniques selected from a group consisting of AES symmetric-key algorithm, Diffie-Hellman key exchange, SHA-1 hash function, forward secrecy, deniable authentication, and malleable encryption, and/or the like. In some instances, the IoT protocol-based, machine-to-machine communication channel is established using an IoT protocol, while the secure OTR communication session is established using an OTR communication protocol, and the OTR communication protocol is part of the IoT protocol. Merely by way of example, in some cases, other communications or messaging protocols (and/or systems) may be implemented, including, but not limited to, one or more of MQ telemetry transport ("MQTT"), extensible messaging and presence protocol ("XMPP"), universal plug and play ("UPnP"), data distribution service ("DDS"), advanced message queuing protocol ("AMQP"), constrained application protocol ("CoAP"), secure hypertext transfer protocol ("HTTPS"), supervisory control and data acquisition ("SCADA"), and/or the like.

In some embodiments, the first device and the second device might be located in proximity to each other (e.g., located in the same customer premises, located within line of sight, located within wireless communications range, and/or the like). Alternatively, the first device and the second device might be located at different geographic locations, and establishing the secure OTR communication session might comprise establishing, with the computing device, a secure off-the-record ("OTR") communication session between the first device and the second device over the at least one network via one or more intermediary devices, or the like.

With reference to FIG. 4B, which is an alternative implementation compared with method 400 of FIG. 4A, method 400', at block 405, might be the same or similar to block 405 of method 400, and might comprise providing, with a computing device (e.g., computing device 115, 210, or 320, or broker/gateway 210 or 315 of FIGS. 1-3, and/or the like), connectivity between a first device (e.g., one or more of IoT Endpoints 105, 110, 205, and/or 305 of FIGS. 1-3, and/or the like) and a second device (e.g., one or more of IoT Endpoints 105, 110, 205, and/or 305 of FIGS. 1-3, and/or the like) over at least one network (e.g., network 120 of FIG. 1, and/or the like), by establishing an IoT protocol-based, machine-to-machine communication channel between the first device and the second device over the at least one network that allows autonomous machine-to-machine communications between the first device and the second device, without any user interaction or any user input during the autonomous machine-to-machine communications.

In some embodiments, the computing device might comprise a gateway device including, without limitation, at least one of an ONT, a NID, an eNID, a RG device, a BG device, or a vG device, and the gateway device is located at or near a customer premises associated with a user associated with one of the first device or the second device. Alternatively, or additionally, the computing device might include, but is not limited to, at least one of an ONT, a NID, an eNID, or a server computer, each of which is controlled by a network service provider. In yet other embodiments, the computing device might itself be one of the first device or the second device.

Merely by way of example, according to some embodiments, the first device and the second device might each include, without limitation, one of a desktop computer, a laptop computer, a tablet computer, a smart phone, a mobile phone, a personal digital assistant, a printer, a scanner, a data storage device, a NAP, a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system, and/or the like. In some cases, the at least one network might include, but is not limited to, one or more of a LAN, a WAN, a WWAN, a VPN, the Internet, or an extranet, and/or the like.

At block 420, method 400' might further comprise receiving, with the computing device, an indication from at least one of the first device and the second device that at least one data packet of the plurality of data packets will likely contain sensitive information. In some embodiments, the sensitive information might include, without limitation, at least one of information about a user associated with at least one of the first device or the second device, information associated with a customer premises associated with the user associated with the at least one of the first device or the second device, information associated with communications protocols used by one or both of the first device or the second device, or information about other users who are associated with the customer premises associated with the user associated with the at least one of the first device or the second device, and/or the like.

Based at least in part on receiving the indication that at least one data packet of the plurality of data packets will likely contain sensitive information, method 400' might further comprise establishing, with the computing device, a secure off-the-record ("OTR") communication session within the IoT protocol-based, machine-to-machine communication channel between the first device and the second device over the at least one network (block 425). The secure OTR communication session provides encrypted machine-to-machine communications between the first device and the second device, without any content of communications that is exchanged between the first device and the second device over the secure OTR communication session being recorded or logged.

Merely by way of example, in some cases, the content of communications that is exchanged between the first device and the second device over the secure OTR communication session might include, but is not limited to, at least one of information about the first device, information about the second device, information about a user associated with the first device, information about a user associated with the second device, information about dates or times of the communications exchanged between the first device and the second device over the secure OTR communication session, or one or more of data content, text content, recorded voice content, image content, video content, sensor data content, or instruction content of the communications exchanged between the first device and the second device over the secure OTR communication session, and/or the like.

According to some embodiments, the secure OTR communication session is based at least in part on off-the-record messaging protocol. Alternatively, or additionally, the secure OTR communication session utilizes one or more cryptographic protocols or techniques selected from a group consisting of AES symmetric-key algorithm, Diffie-Hellman key exchange, SHA-1 hash function, forward secrecy, deniable authentication, and malleable encryption, and/or the like. In some instances, the IoT protocol-based, machine-to-machine communication channel is established using an IoT protocol, while the secure OTR communication session is established using an OTR communication protocol, and the OTR communication protocol is part of the IoT protocol. Merely by way of example, in some cases, other communications or messaging protocols (and/or systems) may be implemented, including, but not limited to, one or more of MQ telemetry transport ("MQTT"), extensible messaging and presence protocol ("XMPP"), universal plug and play ("UPnP"), data distribution service ("DDS"), advanced message queuing protocol ("AMQP"), constrained application protocol ("CoAP"), secure hypertext transfer protocol ("HTTPS"), supervisory control and data acquisition ("SCADA"), and/or the like.

In some embodiments, the first device and the second device might be located in proximity to each other (e.g., in the same customer premises, within line of sight, within wireless communications range, and/or the like). Alternatively, the first device and the second device are located at different geographic locations, and establishing the secure OTR communication session might comprise establishing, with the computing device, a secure off-the-record ("OTR") communication session between the first device and the second device over the at least one network via one or more intermediary devices, or the like.

Although not shown in FIG. 4, from the perspective of one of the first device or second device (i.e., IoT capable device or IoT Endpoint device, as described in detail above with respect to FIGS. 1-4), the IoT capable device might send information to a second IoT capable device over a secure off-the-record ("OTR") communication session that is established within an IoT protocol-based, machine-to-machine communication channel between the IoT capable device and the second IoT capable device over at least one network, the secure OTR communication session providing encrypted machine-to-machine communications between the IoT capable device and the second IoT capable device, without the information being recorded or logged. The information might be the same or similar to that as described above. Likewise, the secure OTR communication session might be the same or similar to that as described above.

Exemplary System and Hardware Implementation

Figure 5:
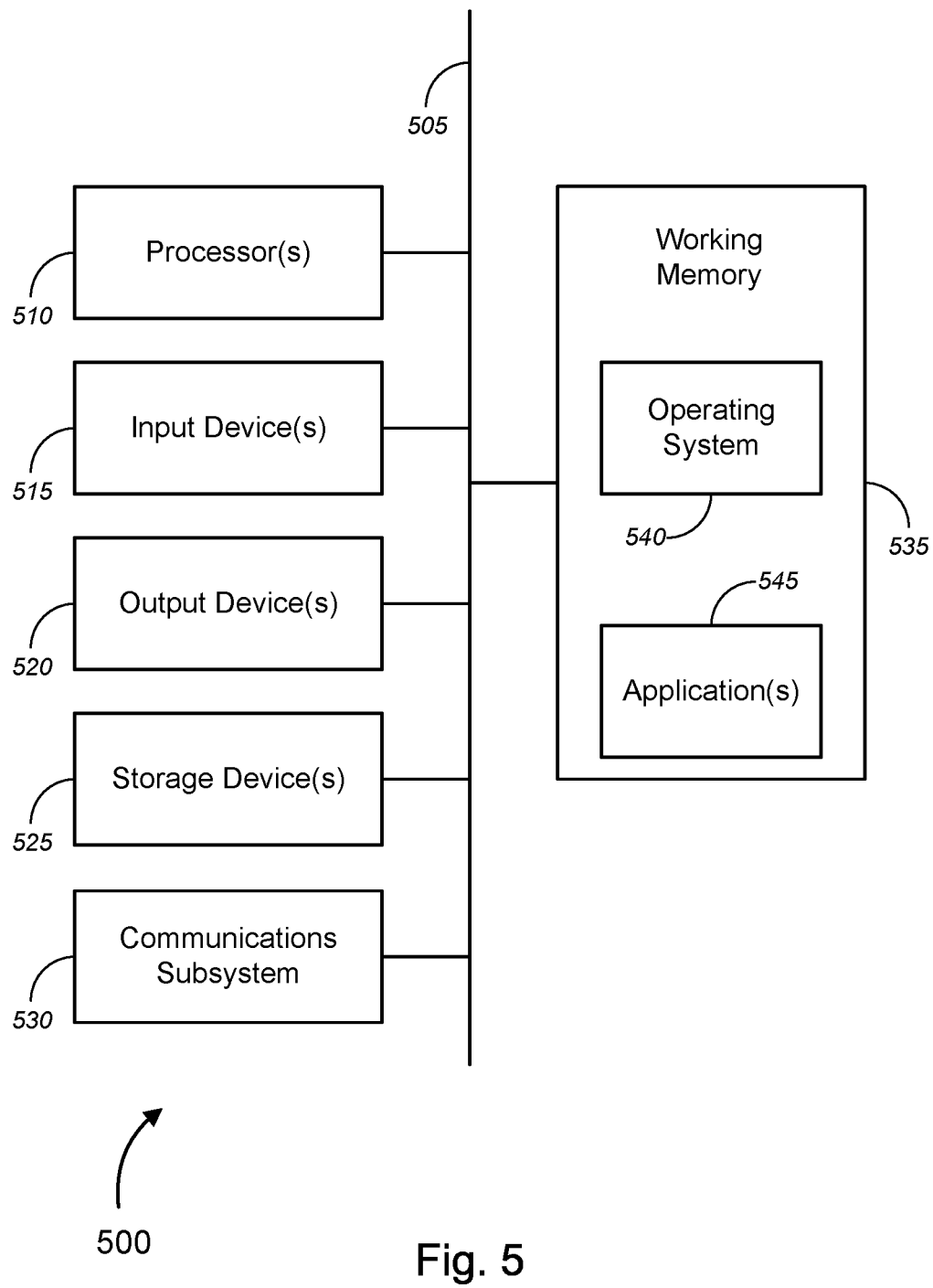
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., IoT Endpoints 105, 110, 205, and/or 305, computing devices 115, 210, and/or 320, broker/gateway 210 and/or 315, analytics engines 135 and/or 335, application service providers ("ASPs") or ASP servers 145 and/or 345, user devices 155 and/or 355, mobile user devices 160, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., IoT Endpoints 105, 110, 205, and/or 305, computing devices 115, 210, and/or 320, broker/gateway 210 and/or 315, analytics engines 135 and/or 335, application service providers ("ASPs") or ASP servers 145 and/or 345, user devices 155 and/or 355, mobile user devices 160, etc.), described above with respect to FIGS. 1-3—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, sensors, and/or the like; and one or more output devices 520, which can include, without limitation, a display device, a printer, indicator lights, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, apps, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
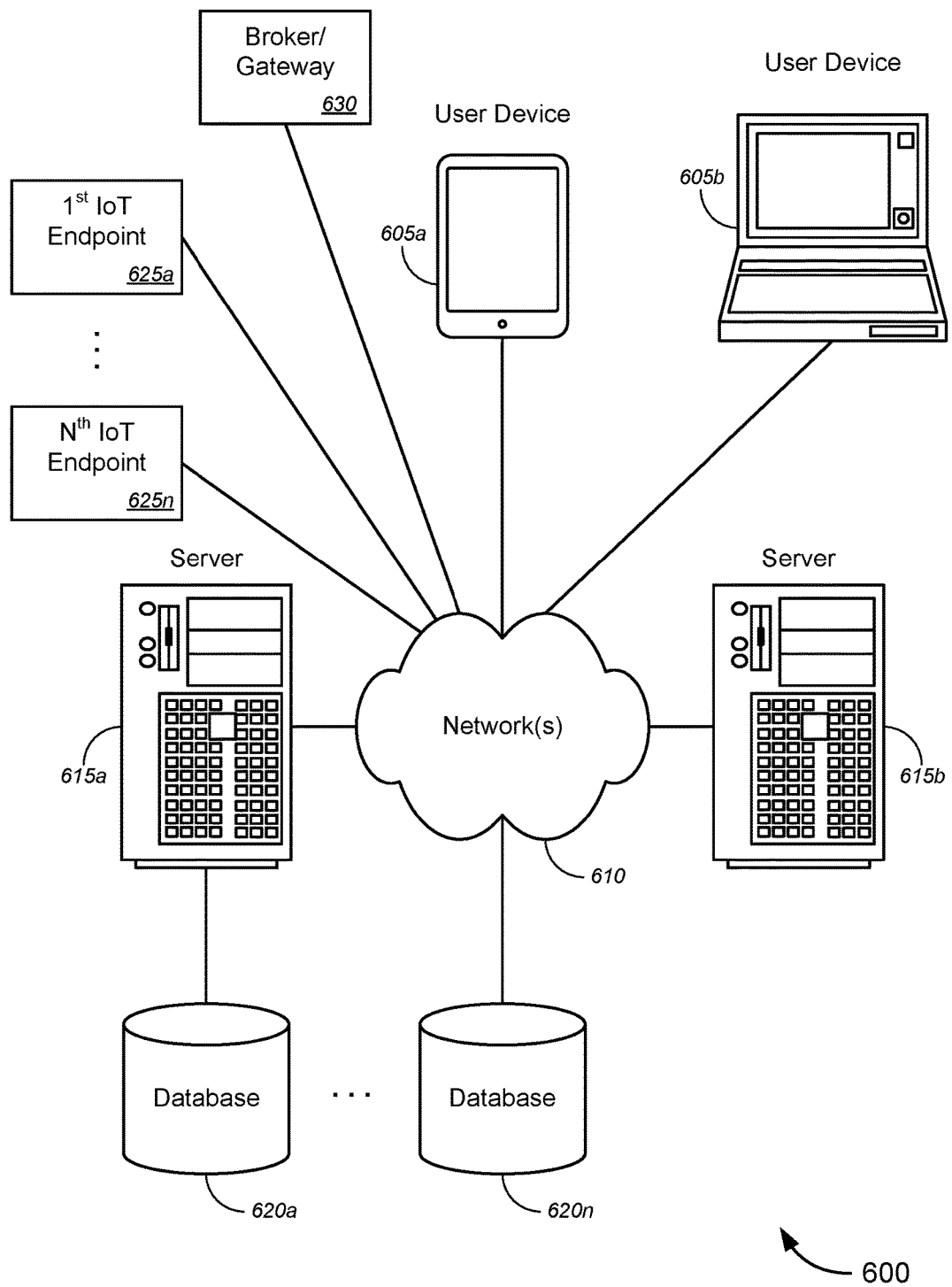
FIG. 6 is a block diagram illustrating a networked system of computers, computing systems, or system hardware architecture, which can be used in accordance with various embodiments.

As noted above, a set of embodiments comprises methods and systems for implementing communications for Internet of Things ("IoT") devices, and, in particular embodiments, to methods, systems, apparatus, and computer software for implementing secure communications for IoT devices. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, smart phone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing secure communications for IoT devices, or the like, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise first through $N^{th}$ Internet of Things ("IoT") Endpoints 625a-625n (collectively, "IoT Endpoints 625"), which might correspond to one or more of IoT Endpoints 105, 110, 205, and/or 305 of FIGS. 1-3. System 600 might also comprise broker/gateway 630, which might correspond to one or more of computing devices 115, 210, and/or 320 or broker/gateway 210 and/or 315 of FIGS. 1-3, and/or the like. In some cases, user computer, user device, or customer device 605 might correspond to user devices 155 and/or 355 or mobile user devices 160 of FIGS. 1 and 3, while servers 615 might correspond to analytics engines 135 and/or 335 or ASP servers 145 and/or 345 of FIGS. 1 and 3, and databases 620 might correspond to data lake 130 and/or 330 or databases 140 and 150 of FIGS. 1 and 3.

The broker/gateway 630 might provide secure communications over IoT protocol between or amongst two or more of the IoT Endpoints 625, as described in detail above with respect to FIGS. 1-4. In some embodiments, the servers 615 (particularly, those servers corresponding to analytics engines 135 and/or 335) might analyze characteristics of the communications (but not the content of the communications, for OTR communications) to ensure secure transmission of data or other content. The user devices 605, in some instances, might receive notifications, data, updates, content, and/or the like that are associated with the characteristics of the communications (but not the content of the communications), as a result of the secure communications amongst the IoT Endpoints 625, particularly, those notifications, data, updates, content, and/or the like that might be determined (e.g., by the servers 615 and/or the broker/gateway 630, and/or the like) to be pertinent to the user(s) associated with user devices 605. The servers 615 (particularly, those servers corresponding to ASP servers 145 and/or 345) might receive notifications, data, updates, content, and/or the like that are associated with the characteristics of the communications (but not the content of the communications), as a result of the secure communications amongst the IoT Endpoints 625, particularly, those notifications, data, updates, content, and/or the like that might be determined (e.g., by the servers 615 and/or the broker/gateway 630, and/or the like) to be pertinent to ASPs, as feedback or the like for improving existing apps or software for IoT Endpoints (or for improving communications in general, or the like), for developing new apps or software for IoT Endpoints, for improving and/or developing user interfaces for user devices for interacting with, setting up, and/or selecting preferences associated with each of one or more IoT Endpoints, and/or the like.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:
1. A method, comprising:
providing, with a computing device, connectivity between a first device and a second device over at least one network, by establishing an Internet-of-Things ("IoT") protocol-based, machine-to-machine communication channel between the first device and the second device over the at least one network that allows autonomous machine-to-machine communications between the first device and the second device, without any user inter- action or any user input during the autonomous machine-to-machine communications;

receiving, with the computing device, an indication from at least one of the first device and the second device that at least one data packet of the plurality of data packets will contain sensitive information; and automatically establishing, based at least in part on receiving the indication from at least one of the first device and the second device that at least one data packet of the plurality of data packets will contain sensitive information, without any user interaction or any user input, and with the computing device, a secure off-the-record ("OTR") communication session within the IoT protocol-based, machine-to-machine communication channel between the first device and the second device over the at least one network, the secure OTR communication session providing encrypted machine-to-machine communications between the first device and the second device, without any content of communications that is exchanged between the first device and the second device over the secure OTR communication session being recorded or, logged wherein the secure OTR communication session utilizes one or more cryptographic protocols or techniques selected from a group consisting of AES symmetric-key algorithm, Diffie-Hellman key exchange, SHA-1 hash function, forward secrecy, deniable authentication, and malleable encryption, wherein the IoT protocol-based, machine-to-machine communication channel is established using an IoT protocol, wherein the secure OTR communication session is established using an OTR communication protocol, and wherein the OTR communication protocol is part of the IoT protocol, and wherein the first device and the second device are located in proximity to each other.

2. The method of claim 1, wherein the content of communications that is exchanged between the first device and the second device over the secure OTR communication session comprises at least one of information about the first device, information about the second device, information about a user associated with the first device, information about a user associated with the second device, information about dates or times of the communications exchanged between the first device and the second device over the secure OTR communication session, or one or more of data content, text content, recorded voice content, image content, video content, sensor data content, or instruction content of the communications exchanged between the first device and the second device over the secure OTR communication session.

3. The method of claim 1, wherein the sensitive information includes at least one of information about a user associated with at least one of the first device or the second device, information associated with a customer premises associated with the user who is associated with the at least one of the first device or the second device, information associated with communications protocols used by one or both of the first device or the second device, or information about other users who are associated with the customer premises associated with the user who is associated with the at least one of the first device or the second device.

4. The method of claim 1, wherein the secure OTR communication session is based at least in part on off-the-record messaging protocol.

5. The method of claim 1, wherein the computing device comprises a gateway device comprising at least one of an optical network terminal ("ONT"), a network interface device ("NID"), an enhanced NID ("eNID"), a residential gateway ("RG") device, a business gateway ("BG") device, or a virtual gateway ("vG") device, wherein the gateway device is located at or near a customer premises associated with a user who is associated with one of the first device or the second device.

6. The method of claim 1, wherein the computing device comprises at least one of an optical network terminal ("ONT"), a network interface device ("NID"), an enhanced NID ("eNID"), or a server computer, each of which is controlled by a network service provider.

7. The method of claim 1, wherein the computing device is one of the first device or the second device.

8. The method of claim 1, wherein the first device and the second device each comprises one of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system.

9. The method of claim 1, wherein the at least one network comprises one or more of a local area network ("LAN"), a wide area network ("WAN"), a wireless wide area network ("WWAN"), a virtual private network ("VPN"), the Internet, or an extranet.

10. A computing device, comprising:
at least one processor; and
a non-transitory computer readable medium communicatively coupled to the at least one processor, the non-transitory computer readable medium having stored thereon computer software comprising a set of instructions that, when executed by the at least one processor, causes the computing device to:
provide connectivity between a first device and a second device over at least one network, by establishing an Internet-of-Things ("IoT") protocol-based, machine-to-machine communication channel between the first device and the second device over the at least one network that allows autonomous machine-to-machine communications between the first device and the second device, without any user interaction or any user input during the autonomous machine-to-machine communications;
receive an indication from at least one of the first device and the second device that at least one data packet of the plurality of data packets will contain sensitive information; and
automatically establish, based at least in part on receiving the indication from at least one of the first device and the second device that at least one data packet of the plurality of data packets will contain sensitive information and without any user interaction or any user input, a secure off-the-record ("OTR") communication session within the IoT protocol-based, machine-to-machine communication channel between the first device and the second device over the at least one network, the secure OTR communication session providing encrypted machine-to-machine communications between the first device and the second device, without any content of communications that is exchanged between the first device and the second device over the secure OTR communication session being recorded or, logged, wherein the secure OTR communication session utilizes one or more cryptographic protocols or techniques selected from a group consisting of AES symmetric-key algorithm, Diffie-Hellman key exchange, SHA-1 hash function, forward secrecy, deniable authentication, and malleable encryption, wherein the IoT protocol-based, machine-to-machine communication channel is established using an IoT protocol, wherein the secure OTR communication session is established using an OTR communication protocol, and wherein the OTR communication protocol is part of the IoT protocol, and wherein the first device and the second device are located in proximity to each other.

11. The computing device of claim 10, wherein the secure OTR communication session is based at least in part on off-the-record messaging protocol.

12. An Internet-of-Things ("IoT") capable device, comprising:
   at least one processor; and
   a non-transitory computer readable medium communicatively coupled to the at least one processor, the non-transitory computer readable medium having stored thereon computer software comprising a set of instructions that, when executed by the at least one processor, causes the IoT capable device to:
   send an indication to a computing system that at least one data packet of the plurality of data packets will contain sensitive information; and
   send information to a second IoT capable device over a secure off-the-record ("OTR") communication session that is automatically established, without any user interaction or any user input, within an IoT protocol-based, machine-to-machine communication channel between the IoT capable device and the second IoT capable device over at least one network, the secure OTR communication session providing encrypted machine-to-machine communications between the IoT capable device and the second IoT capable device, without the information being recorded or, logged wherein the secure OTR communication session utilizes one or more cryptographic protocols or techniques selected from a group consisting of AES symmetric-key algorithm, Diffie-Hellman key exchange, SHA-1 hash function, forward secrecy, deniable authentication, and malleable encryption, wherein the IoT protocol-based, machine-to-machine communication channel is established using an IoT protocol, wherein the secure OTR communication session is established using an OTR communication protocol, and wherein the OTR communication protocol is part of the IoT protocol, and wherein the first device and the second device are located in proximity to each other.

13. The IoT capable device of claim 12, wherein the information comprises at least one of information about the IoT capable device, information about the second IoT capable device, information about a user associated with the IoT capable device, information about a user associated with the second IoT capable device, information about dates or times of the communications exchanged between the IoT capable device and the second IoT capable device over the secure OTR communication session, or one or more of data content, text content, recorded voice content, image content, video content, sensor content, or instruction content of the communications exchanged between the IoT capable device and the second IoT capable device over the secure OTR communication session.

14. The IoT capable device of claim 12, wherein the IoT capable device and the second IoT capable device each comprises one of a desktop computer, a laptop computer, a tablet computer, a smart phone, a mobile phone, a personal digital assistant, a printer, a scanner, a data storage device, a network access point ("NAP"), a television, a set-top box, an image capture device, an image projection device, a video capture device, a video projection device, a watch, a clock, a gaming console, a thermostat, a kitchen appliance, a medical device, a vehicle, a speaker, an audio headset, a telephone system, a media recording device, a media playback device, a lighting system, a sensing device, a door locking system, a customer premises security control system, a window locking system, a window covering system, or a sprinkler system.

* * * * *